(12) United States Patent
Partyka, Sr. et al.

(10) Patent No.: US 11,835,976 B2
(45) Date of Patent: Dec. 5, 2023

(54) ELECTRONIC VOLTAGE REGULATOR APPARATUS AND METHOD

(71) Applicant: PTI Transformers Inc., Regina (CA)

(72) Inventors: George Partyka, Sr., Regina (CA); Waldemar Ziomek, Winnipeg (CA); Abolfazl Babaei, Winnipeg (CA); Greg Parsons, Winnipeg (CA); Aniruddha Gole, Winnipeg (CA)

(73) Assignee: PTI Transformers Inc., Regina (CA)

( * ) Notice: Subject to any disclaimer, the term of this patent is extended or adjusted under 35 U.S.C. 154(b) by 0 days.

(21) Appl. No.: 17/703,369

(22) Filed: Mar. 24, 2022

(65) Prior Publication Data

US 2023/0095765 A1   Mar. 30, 2023

Related U.S. Application Data

(60) Provisional application No. 63/250,034, filed on Sep. 29, 2021.

(51) Int. Cl.
*G05F 1/24* (2006.01)
*H02M 1/00* (2006.01)

(52) U.S. Cl.
CPC ............. *G05F 1/24* (2013.01); *H02M 1/0093* (2021.05)

(58) Field of Classification Search
CPC ........ G05F 1/12; G05F 1/14; G05F 1/153–20; G05F 1/24; G05F 1/253–30; G05F 1/70;
(Continued)

(56) References Cited

U.S. PATENT DOCUMENTS

| | | | | |
|---|---|---|---|---|
| 2009/0218993 | A1* | 9/2009 | Berggren | H02J 3/1878 323/205 |
| 2010/0220499 | A1* | 9/2010 | Haj-Maharsi | H02M 1/4233 363/13 |
| 2014/0177293 | A1* | 6/2014 | Eckhardt | H02M 1/42 363/37 |
| 2016/0190950 | A1* | 6/2016 | Divan | H01F 27/29 323/301 |

(Continued)

FOREIGN PATENT DOCUMENTS

| | | | | |
|---|---|---|---|---|
| DE | 102009014243 A1 * | 9/2010 | | G05F 1/20 |
| DE | 102009014243 A2 | 9/2010 | | |

(Continued)

*Primary Examiner* — Fred E Finch, III
(74) *Attorney, Agent, or Firm* — MILLER THOMSON LLP; David Schnurr

(57) ABSTRACT

There is disclosed new topology for an Electronic Voltage Regulator (EVR) which can apply additive or subtractive (aka boost or buck) voltages to compensate for an increase or decrease in system voltages. This regulator employs a ladder of power capacitors which are in series and connected across the input voltage to apply different levels of voltages to a controlled or regulated transformer. Considering this, the proposed EVR can be utilized as a replacement for conventional electromechanical type on-load tap changers or (OLTCs) commonly used in power transformers, and meant to compensate voltage changes in a system. Electromechanical tap changers have some significant issues, such as defined time durations when switching to different taps, as determined by the spring-loaded mechanism's operation; a high malfunction rate due to mechanical switching when causing arcing, and thereby decreasing the operating lifetime of transformers. In this EVR instead of electromechanical taps, a combination of capacitors and TRIACs are used at each voltage level to eliminate arcing effects while increasing the speed of the tap changing process. Furthermore, the electronic regulator can improve the load power factor due to the presence of capacitors. Other advantages over conventional OLTC's is the elimination of a reactor, if used, and the elimination of a tap winding with its numerous (Continued)

tap leads and having correspondingly higher cost. This will reduce the overall size of the active part of the main transformers and improve efficiency by reducing operating losses. In addition, a new failure detection method is included that detects a failed TRIAC to enable the system to continue operating. The failure detection circuit is seamlessly incorporated within the main circuit and has a high-speed detection rate.

11 Claims, 17 Drawing Sheets

(58) Field of Classification Search
CPC .... H02M 1/0093; H02M 1/42; H02M 1/4208; H02M 1/4266; H02M 5/10; H02M 5/12; H02J 3/12; H02J 3/16; H02J 3/1878
See application file for complete search history.

(56) References Cited

U.S. PATENT DOCUMENTS

| | | | |
|---|---|---|---|
| 2019/0302814 A1* | 10/2019 | Cornelius | G05F 1/14 |
| 2020/0153354 A1* | 5/2020 | Ozeri | H02M 7/06 |
| 2021/0313898 A1* | 10/2021 | Stewart | H02M 5/293 |

FOREIGN PATENT DOCUMENTS

| | | | | |
|---|---|---|---|---|
| EP | 3839999 A1 * | 6/2021 | | G05F 1/45 |
| EP | 3839999 A1 | 6/2021 | | |
| WO | 2006087402 A2 | 8/2006 | | |
| WO | WO-2006087402 A2 * | 8/2006 | | H02M 5/257 |
| WO | 2010091260 A2 | 8/2010 | | |
| WO | WO-2010091260 A2 * | 8/2010 | | H02M 1/42 |
| WO | 2011127906 A2 | 10/2011 | | |
| WO | WO-2011127906 A2 * | 10/2011 | | G05F 1/24 |

* cited by examiner

ELECTRONIC VOLTAGE REGULATOR APPARATUS AND METHOD

FIELD OF THE INVENTION

The present disclosure pertains to electrical transformers, circuits and methodology.

BACKGROUND

The generated electricity in power plants is transmitted over a transmission line system at high voltage levels. At distribution substations, the voltage is stepped down and voltage and current are supplied to different loads within a distribution network. Voltage regulation at the distribution network is very important, since an increasing share of intermittent and highly variable renewable energy generation connected at the distribution level leads to larger and more frequent voltage fluctuations in distribution grids. Thus, utilizing on-load tap changer (OLTC) transformers in power systems is becoming more necessary, as distribution grids with large amounts of renewable energy generation are increasingly becoming more commonplace.

A voltage regulator is widely used in existing power delivery systems, such as HVDC, HVAC, Renewable Energies, and in power transformers. Currently, conventional electromechanical type OLTCs for power transformers are commonly utilized. Electromechanical tap changers have been widely used, as they enable in-service operations,—i.e. change of the output voltage under load, without interrupting the load current. However, there are some downsides associated with electromechanical tap changers. A significant issue in these electromechanical tap changers is that there is always an arc generated during operation between tap contacts. This arcing process causes the deterioration of transformer oil. As far as the lifetime of the electromechanical tap changers is concerned, they have relatively long lifetime—around 10 to 15 years—and this is mostly because of the low number of taps that they have. A small number of taps is a disadvantage for mechanical taps, as the voltage fluctuation is larger and faster in today's distribution networks due to the increasing share of distributed renewable energy sources. Therefore, OLTC transformers need to switch much more than before. This results in much higher maintenance requirements, and more limited lifetime. Apart from electromechanical tap changers, other types of electronic tap changers have recently been introduced to the market. They use solid state electronic switches, such as thyristors, instead of electromechanical taps to regulate the output voltage level. Although the electronic tap changers could solve arcing problems present in mechanical tap changers, there are still issues such as high levels of harmonics, power consumption, voltage level change speeds, soft start of the regulator, failure detection of solid-state switches, and volume demands of regulators that need to be considered. Corresponding improvements and more precise control of input voltages and currents are still needed to achieve desired improvements in the performance of regulators.

SUMMARY

The present disclosure relates generally pertains to electrical transformers, circuits and methodology, and more particularly to a robust electronic voltage regulator ("EVR") that can be widely used in different industries, especially in single-phase and three-phase tap changing transformer applications, and at any frequency. By way of example, the EVR can be used in new transformers and can also be implemented as a replacement for conventional OLTCs in transformers already in operation.

In an aspect, there is provided an electronic voltage regulator (EVR) for maintaining a desired transformer voltage in transformer applications, comprising: a high-power section implemented as an electronic circuit and including: a capacitor ladder connecting a plurality of capacitors in series, and configured as a voltage divider; a plurality of power resistors operatively connected in parallel with each capacitor of the capacitor ladder; and a plurality of TRIACs to switch and control AC voltages; and a low-power section implemented as an electronic circuit and having a control module, the control module including: a microprocessor; digital logic gates controlled by the microprocessor; a TRIAC driver to control the plurality of TRIACs; and a zero-crossing optotriac to enable the plurality of TRIACs to be turn on or off in either zero voltage or zero current; whereby, in operation, the capacitor ladder is connected across an input voltage and utilized as an electronic tap changer to provide additive or subtractive voltages to maintain the transformer output voltage at a desired level, or within an acceptable range. Advantageously, this unique configuration of a regulator, employing the capacitor ladder, eliminates the need for numerous taps and tap leads used in conventional tap changers.

In an aspect, the presently disclosed EVR apparatus and method can solve the before mentioned problems and provide a regulator with higher speed and higher reliability. The proposed EVR circuit is unique in terms of using a capacitor ladder as a voltage divider, eliminating moving parts and mechanical switching means while providing different levels of voltages to keep the load voltage almost constant. The use of a booster transformer can also enhance the tap changer's application to transformers of larger power and voltage ratings. The key advantage of the proposed EVR circuit is its application in power transformers and series voltage regulating transformers that currently use electro-mechanical tap changers. Electro-mechanical tap changers are slower, can create arcs, and are very expensive. Advantageously, the proposed EVR utilizing an electronic voltage regulator can completely act as a tap changer in a transformer and adjust the controlled voltage in required steps whenever needed. Also, the presented regulator improves the soft switching method of changing voltage levels, while eliminating issues corresponding to arcing. Since all of these features are electronics based, the proposed EVR is much faster than a conventional electromechanical OLTC. This also provides additional advantages to the tap changer by acting quicker and faster at problem detection and self-healing.

In the presented EVR's power module, TRIACs, power capacitors, and RC snubbers are used. Among these components, TRIACs are more sensitive to heat, overvoltage and overcurrent, that can lead to complete TRIAC failure. The disclosed EVR has a very fast failure detection circuit that is easy to implement and is based on a programmable microprocessor. The failure detection circuit is newly developed and detects the failed TRIAC and removes it from the system at its last position. This keeps the regulator working despite the failure of one or more TRIACs.

In another embodiment, the proposed EVR also has another option for a failure detection circuit that is based on analog devices, and there is no microprocessor. However, the second approach will shut down the regulator whenever any TRIAC is failed, and then makes the injected voltage zero. Therefore, the system, i.e. a transformer and regulator, keeps working, but without the regulator being capable of tap changing operation.

In this respect, before explaining at least one embodiment of the invention in detail, it is to be understood that the invention is not limited in its application to the details of construction and to the arrangements of the components set forth in the following description or the examples provided therein, or illustrated in the drawings. Therefore, it will be appreciated that a number of variants and modifications can be made without departing from the teachings of the disclosure as a whole. Therefore, the present system, method and apparatus is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

The present system and method will be better understood, and objects of the invention will become apparent, when consideration is given to the following detailed description thereof. Such description makes reference to the annexed drawings, wherein.

The failure detection circuit shown in FIGS. 2A, 2B, 2C and 2D is extended across the four drawings for clarity.

Figure 3A:
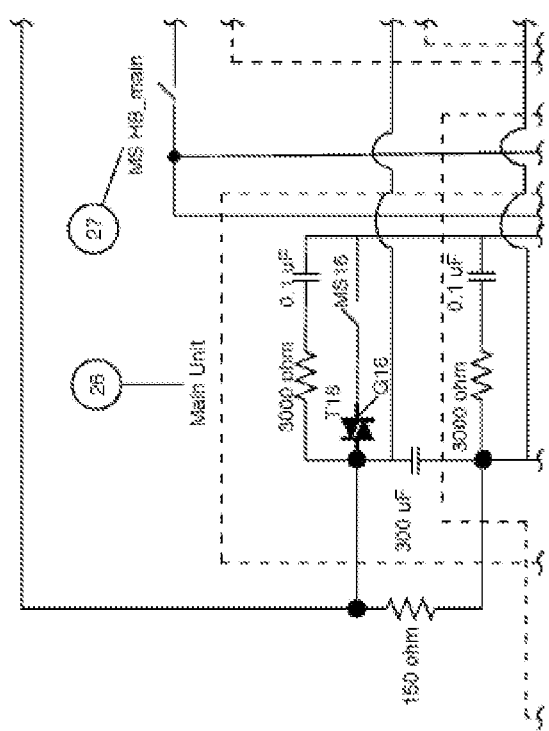

FIG. 3A illustrates a first part of a proposed voltage regulator while using a first failure detection method in accordance with an embodiment.

Figure 3B:
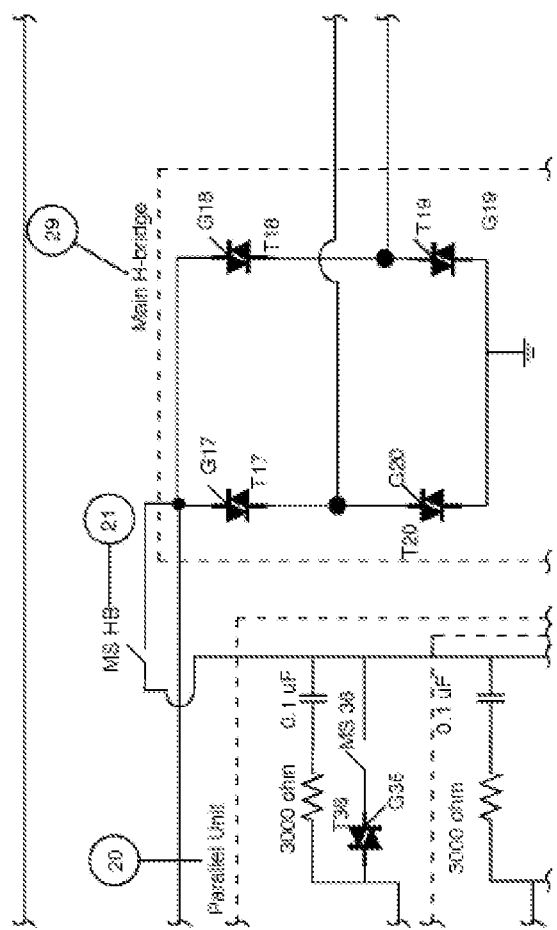

FIG. 3B illustrates a second part of the proposed voltage regulator.

Figure 3C:
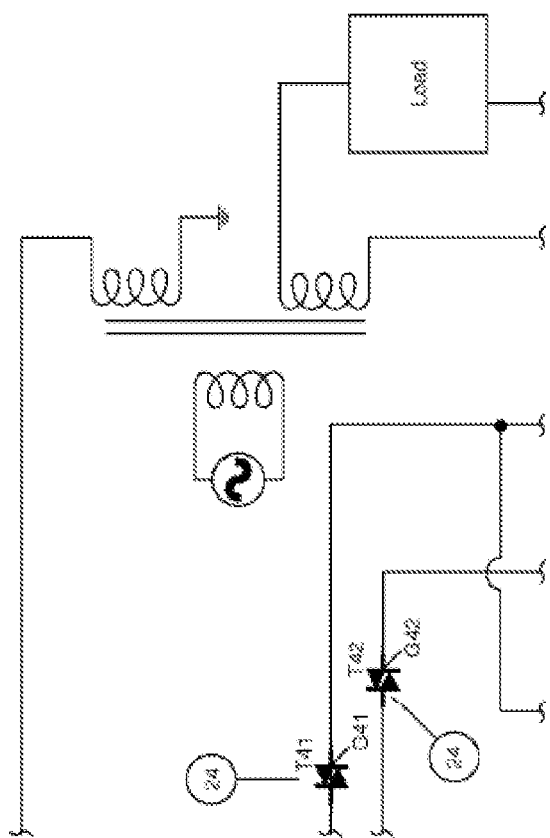

FIG. 3C illustrates a third part of the proposed voltage regulator.

Figure 3D:
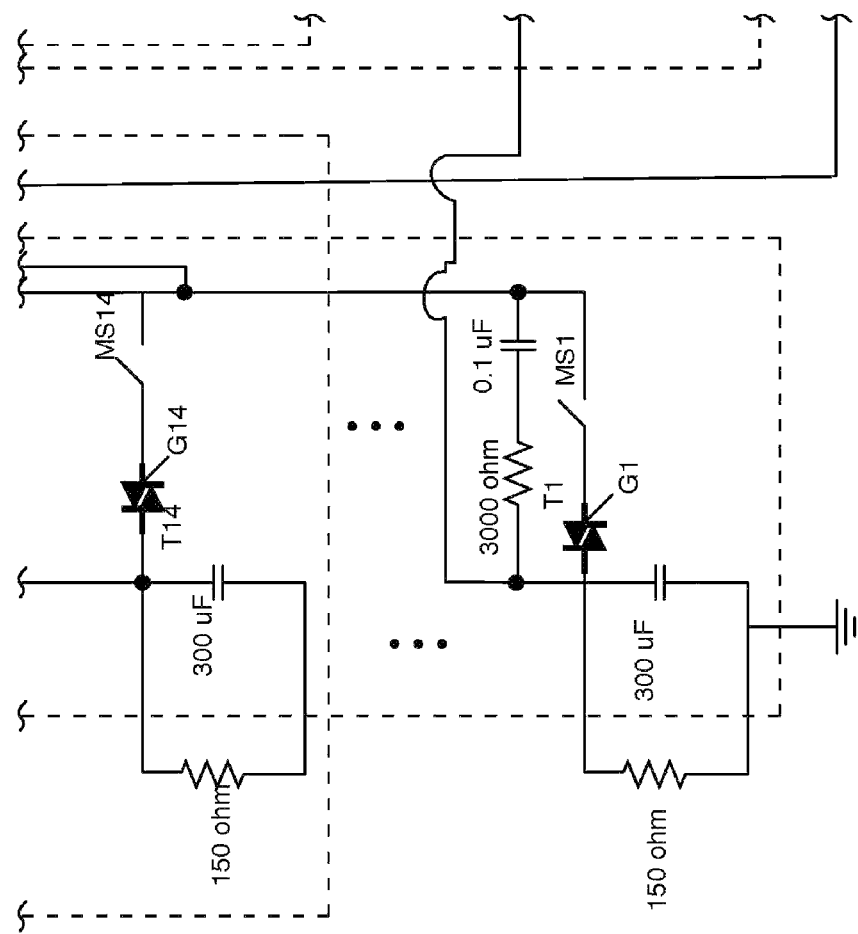

FIG. 3D illustrates a fourth part of the proposed voltage regulator.

Figure 3E:
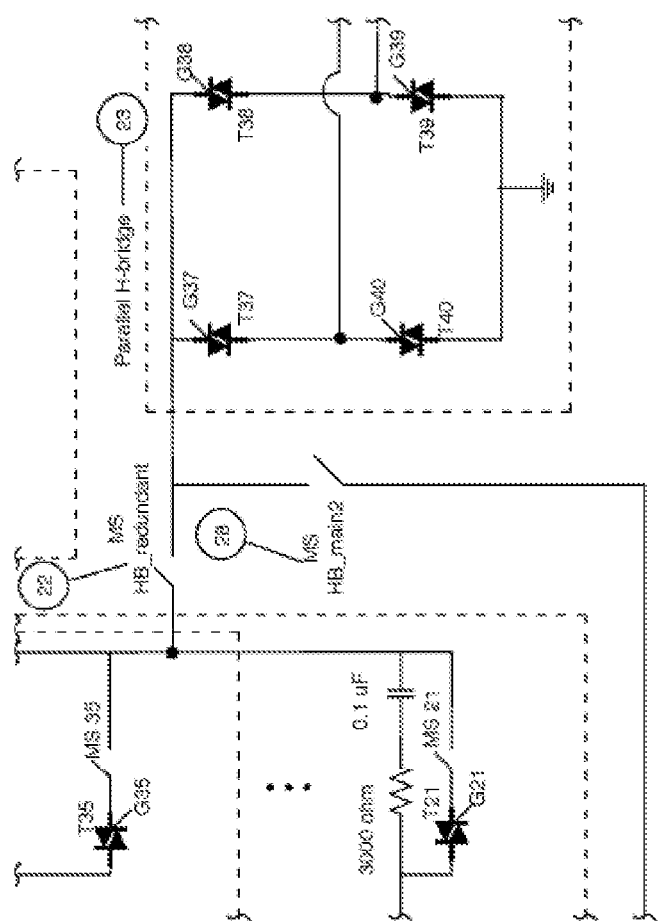

FIG. 3E illustrates a fifth part of the proposed voltage regulator.

Figure 3F:
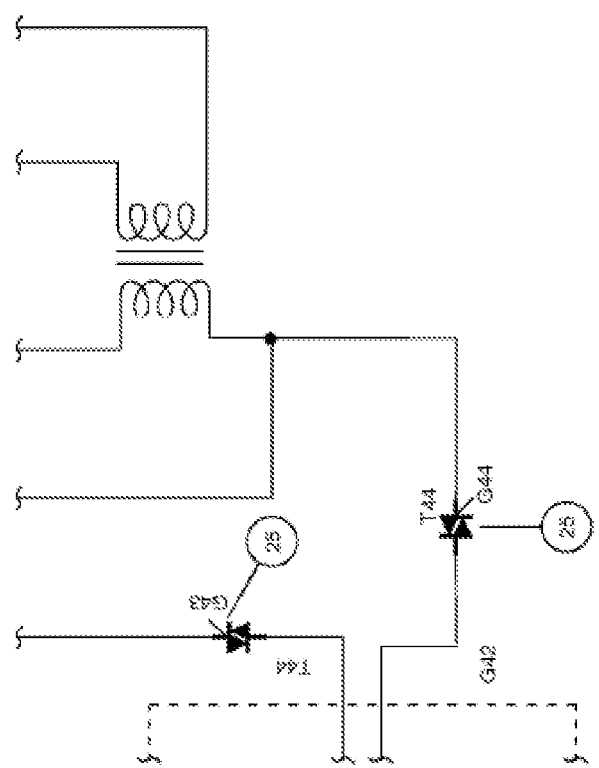

FIG. 3F illustrates a sixth part of the proposed voltage regulator.

The proposed voltage regulator shown in FIGS. 3A, 3B, 3C, 3D, 3E and 3F is extended across the six drawings for clarity.

Figure 4A:
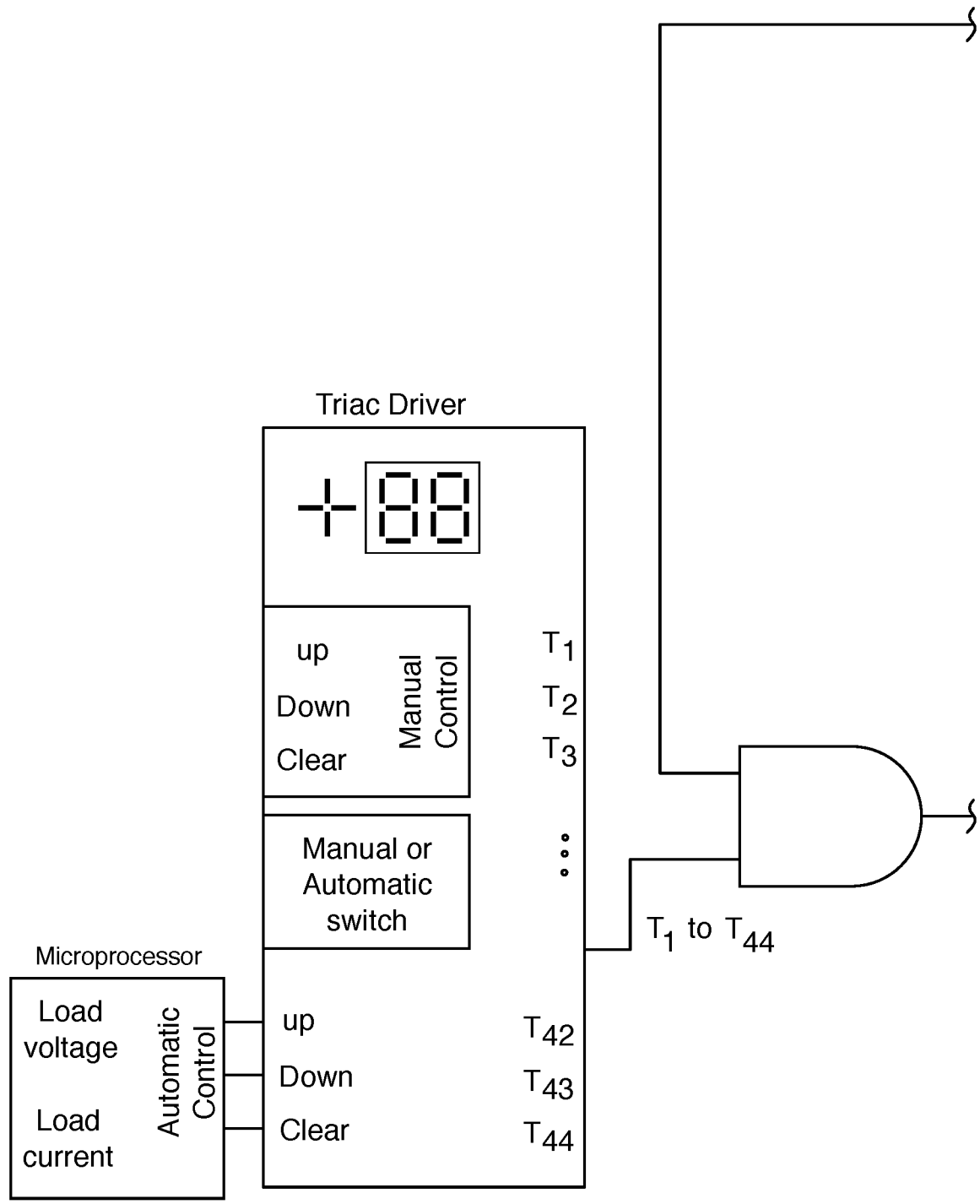

FIG. 4A illustrates a first part of a second failure detection circuit for a TRIAC in accordance with an embodiment.

Figure 4B:
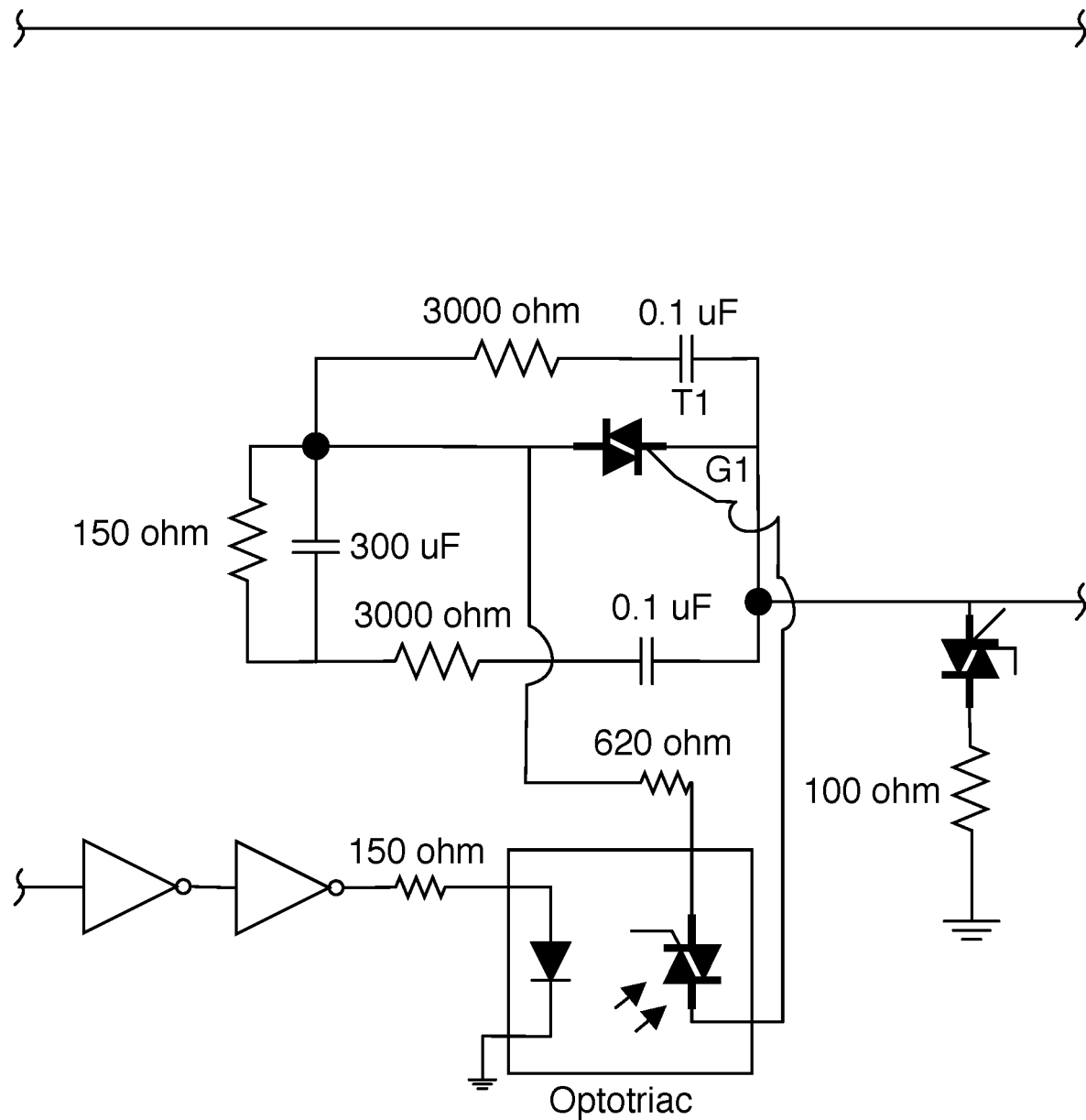

FIG. 4B illustrates a second part of the second failure detection circuit.

Figure 4C:
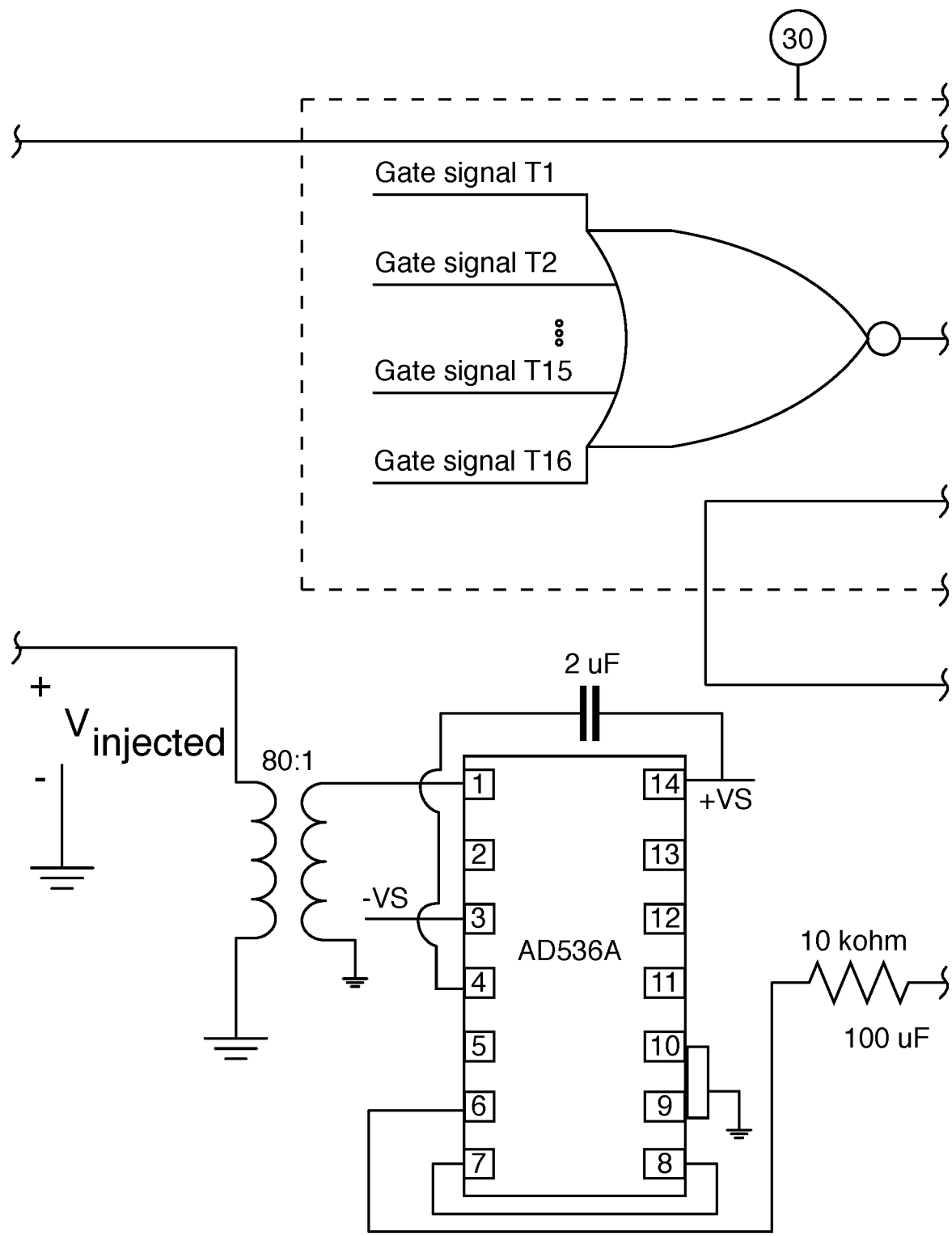

FIG. 4C illustrates a third part of the second failure detection circuit.

Figure 4D:
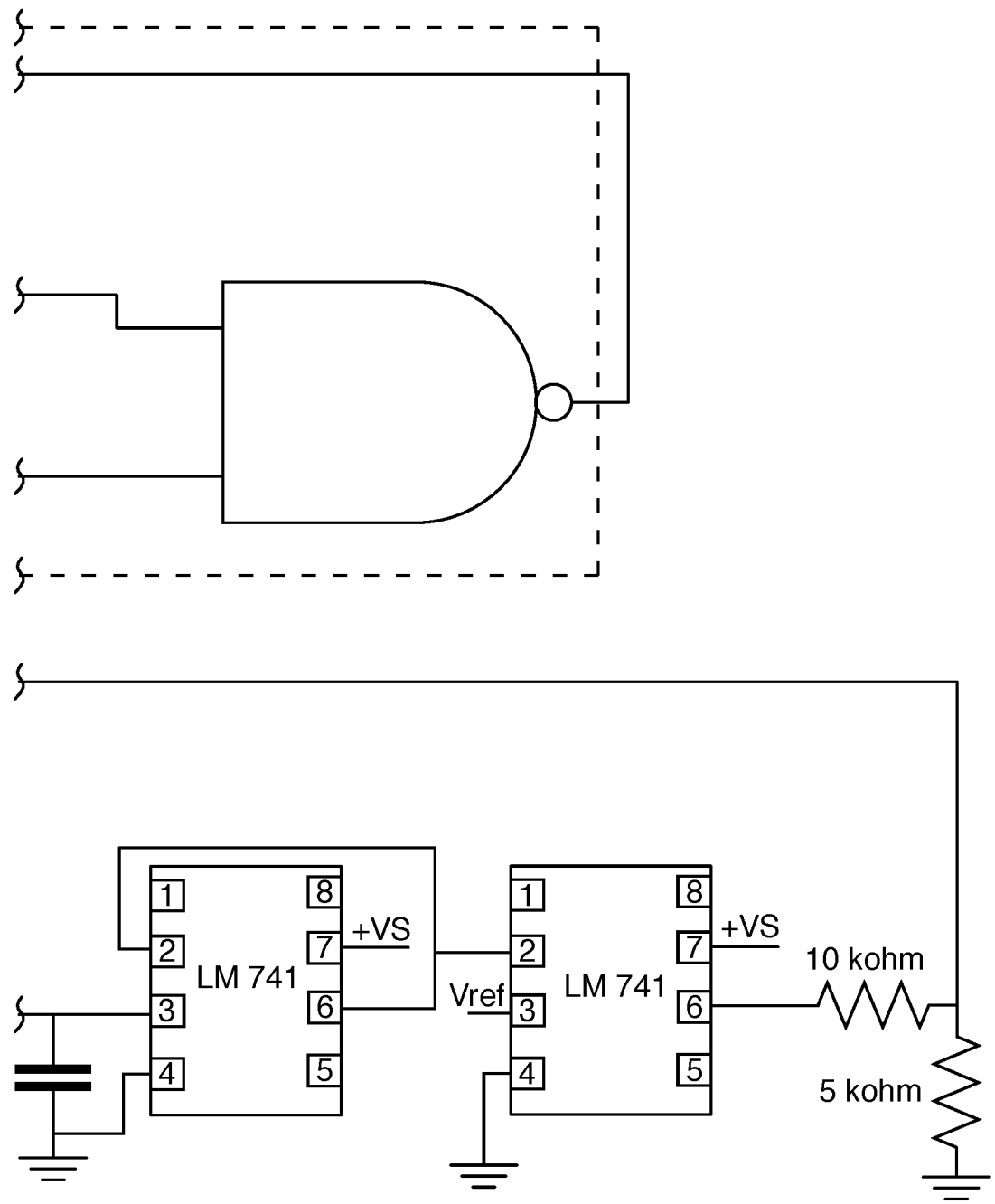

FIG. 4D illustrates a fourth part of the second failure detection circuit.

The failure detection circuit shown in FIGS. 4A, 4B, 4C and 4D is extended across the four drawings for clarity.

Figure 5:
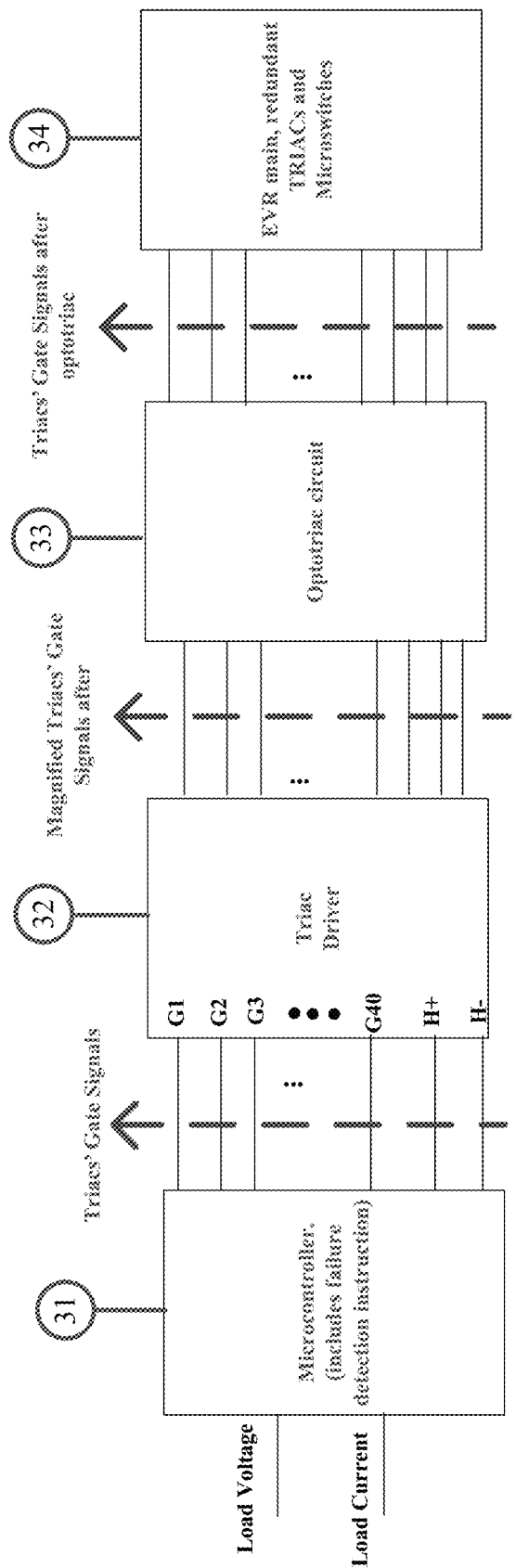

FIG. 5 illustrates a block-based representation of the disclosed EVR in accordance with an embodiment.

Figure 6:
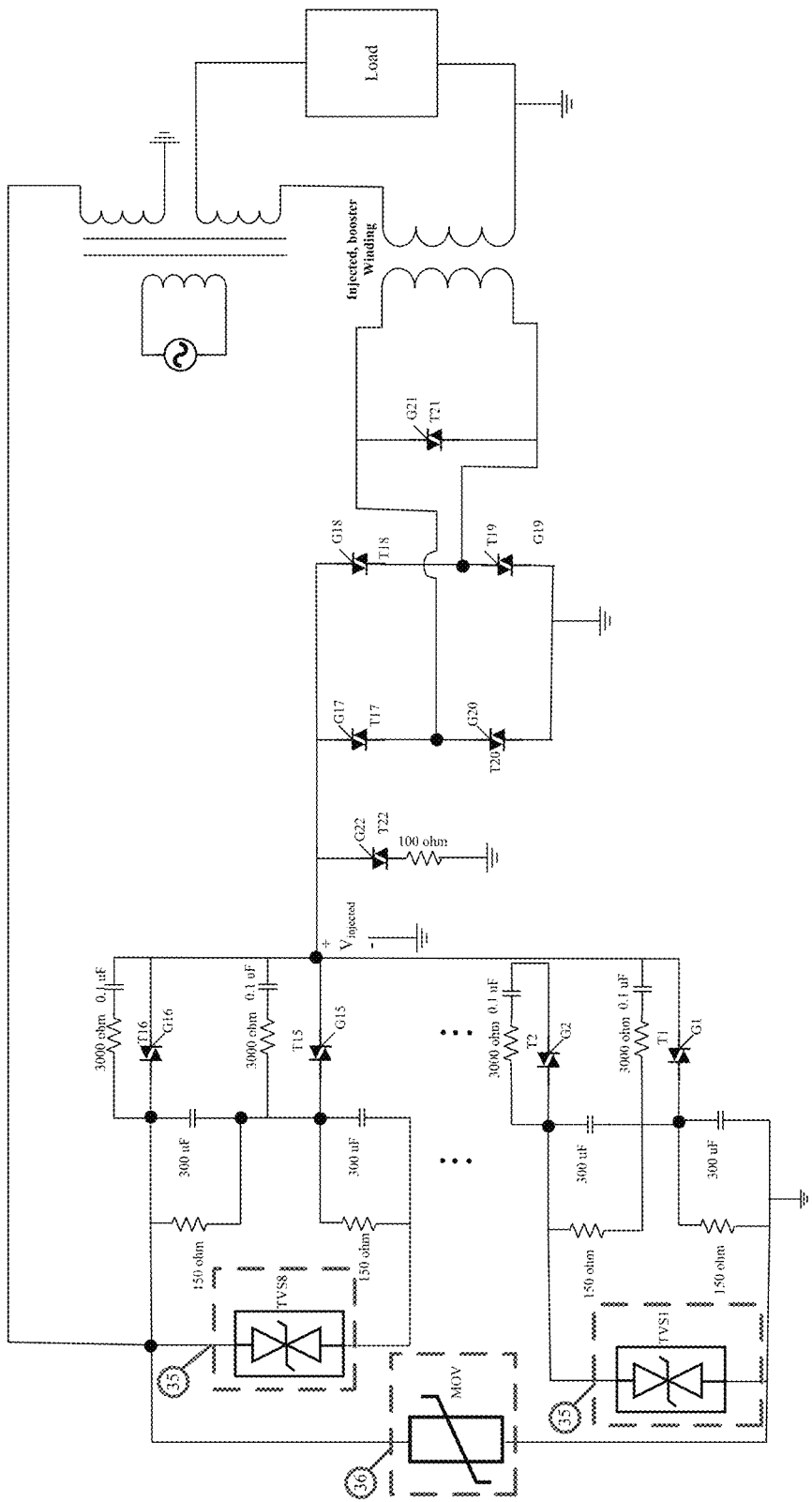

FIG. 6 illustrates the application of transient voltage suppressors, TVS, and metal oxide varistor, MOV, to protect the EVR from transient overvoltages.

In the drawings, embodiments are illustrated by way of example. It is to be expressly understood that the description and drawings are only for the purpose of illustration and as an aid to understanding, and are not intended as describing the accurate performance and behavior of the embodiments and a definition of the limits of the invention.

DETAILED DESCRIPTION

As noted above, the present disclosure relates to a robust electronic voltage regulator ("EVR") that can be widely used in different industries, especially in single-phase and three-phase tap changing transformer applications, and at any frequency.

In an aspect, the presently disclosed EVR apparatus and method can solve the before mentioned problems and provide a regulator with higher speed and higher reliability. The proposed EVR circuit is unique in terms of using a capacitor ladder as a voltage divider, eliminating moving parts and mechanical switching means while providing different levels of voltages to keep the load voltage almost constant. The use of a booster transformer can also enhance the tap changer's application to transformers of larger power and voltage ratings. The key advantage of the proposed EVR circuit is its application in power transformers and series voltage regulating transformers that currently use electro-mechanical tap changers. Electro-mechanical tap changers are slower, can create arcs, and are very expensive. Advantageously, the proposed EVR utilizing an electronic voltage regulator can completely act as a tap changer in a transformer and adjust the controlled voltage in required steps whenever needed. Also, the presented regulator improves the soft switching method of changing voltage levels, while eliminating issues corresponding to arcing. Since all of these features are electronics based, the proposed EVR is much faster than a conventional electromechanical OLTC. This also provides additional advantages to the tap changer by acting quicker and faster at problem detection and self-healing.

In the presented EVR's power module, TRIACs, power capacitors, and RC snubbers are used. Among these components, TRIACs are more sensitive to heat, overvoltage and overcurrent that can lead to complete TRIAC failure. The disclosed EVR has a very fast failure detection circuit that is easy to implement and is based on a programmable microprocessor. The failure detection circuit is newly developed and detects the failed TRIAC and removes it from the system at its last position. This keeps the regulator working despite the failure of one or more TRIACs.

In another embodiment, the proposed EVR also has another option for a failure detection circuit that is based on analog devices, and there is no microprocessor. However, the second approach will shut down the regulator whenever any TRIAC is failed, and then makes the injected voltage zero. Therefore, the system, i.e. a transformer and regulator, keeps working, but without the regulator being capable of tap changing operation.

The disclosed EVR addresses various limitations and disadvantages, as follows.

Matins (U.S. Pat. No. 7,400,121), discloses a soft start method for a voltage regulator. This patent proposed a digital circuit which can help a slow startup voltage in such a way that the voltage can slowly ramp up or down by cyclically coupling a pair of associated external energy storage devices, such as capacitors, during the startup phase. This method can avoid damaging in-rush currents and input voltage spikes. However, according to the proposed embodiment for this patent, this method requires costly high-speed microcontrollers to perform the soft start. The presently disclosed EVR addresses this limitation by providing a more cost effective solution. In this method, varistors or transient suppressors are used along with a parallel resistor with each capacitor in the ladder to help the EVR to have a very smooth start.

Yungtaek Jang et al. (U.S. Pat. No. 9,705,411B2) discloses a soft switching-based full-bridge inverter. In this method, coupled inductors were used to provide a zero-voltage switching situation under a wide range of input voltages. However, using this method in the EVR which includes a ladder of capacitors may not work, as this could create resonant between couple inductors and capacitors as well as high voltage spike. The presented EVR solves the soft start by using passive components such as varistor and parallel resistor with each capacitor in a ladder.

Amirahmadi et al. (U.S. Pat. No. 9,484,840) proposes a control-based solution for the soft switching. This control block measures the input and output voltages and provides a pulse width modulation (PWM) signal for the power switches of the full-bridge. EVR used the snubber-based method for the soft start, which is an effective method to control possible surges during the transition between "on" to "off" state or vice versa. As well, the presented EVR changes the voltage level with a signal activating TRIACs at appropriate level of the ladder, whenever a change happens to the output voltage in order to maintain the load voltage in an acceptable range. The control method used in this invention is based on a microprocessor, and it is a cost-effective solution.

A TRIAC is a high-speed solid-state electronic device that can switch and control AC power in both directions of a sinusoidal waveform. A TRIAC circuit comprises a TRIAC having first and second main terminals (MT1 and MT2) and a gate, a switching (triggering) circuit and a load. One significant challenge of using a TRIAC in a system is that the TRIAC can inadvertently be turned on by temperature induced leakage currents, even if there is no gate signal. This can create serious issues, especially in a voltage regulator in which one solid-state switch such as a TRIAC may be on at each voltage level. Ham et al (U.S. Pat. No. 8,630,074) discloses a method which could prevent a TRIAC from getting turned on by leakage current. This patent uses a thyristor connected between one of the main terminals (MT1, MT2) and control terminal of the TRIAC circuit. The additional thyristor can manage the leakage current problem to a large extent; however, this method is not cost effective in the EVR design, especially since a voltage regulator has many voltage levels, and a Thyristor must be added at each level. In order to prevent the TRIAC from switching on spontaneously, the EVR uses a zero-crossing optotriac which reduces the possibility of circulating current in the TRIAC. The zero-crossing optotriac along with the snubber circuit increase the reliability and robustness of the TRIAC-based EVR.

Failure detection of solid-state switches such as a TRIAC, is always a challenge in power electronic systems, and in particular high voltage regulators. Once a TRIAC has failed, it will be in a complete short-circuited condition, which will deteriorate further when a TRIAC at any voltage level is left on for a prolonged duration. The reason is that it shorts the input voltage and eventually causes total failure of the system. Emberty et al. (U.S. Pat. No. 6,600,238) discloses a method that detects the failed TRIAC and then replaces it with a redundant switch. The detection method is based on measuring the voltage across the TRIAC. If this voltage is less than a certain level, the control circuit considers the TRIAC "failed", and will then activate the redundant switch. However, measuring the voltage across each TRIAC in a circuit containing a high number of TRIACs will make the detection circuit larger, requiring PCBs with more space which leads to more cost. The proposed EVR is utilizing two different methods for the failure detection, and those methods are cost-effective and easy-to-implement. Those failure detection methods give this option to the customer to choose whether the system should stop working after the first failure or continue to work (self-healing option). The details of the failure detection methods are provided further below.

In high voltage applications, converters are used to inject the required buck or boost voltages. Converters are based on solid-state switches such as IGBTs, TRIACs, or MOSFETs. Nowadays, high-frequency converters are proposed which reduce the size of the regulator and increases the speed of the system in changing and detection processes.

Kobayashi (U.S. Pat. No. 8,860,387) discloses a buck-boost converter that can work in 5 different modes such as buck, boost, buck-boost, half frequency either buck or boost, and half frequency buck-boost. The output voltage of this converter is adjustable based on the duty cycle of the solid-state switches. This patent could provide a converter with high efficiency in all five modes. However, conventional converters are a costly solution and have complex control circuits in high voltage applications. The invention in the EVR is to use a capacitor ladder to have a different level of output voltage by using a capacitors-based division of the input voltage. This removes the need for using the conventional converters which have a large number of components, as well as high cost.

Protecting TRIACs from circulating current and providing a smooth transition for TRIACs from one voltage level to the other is an influential factor to increase the lifetime of the TRIAC. The snubber circuit can decrease the circulating current and can also ease the transition between voltage levels. Different snubber circuits have been proposed such as resistor-capacitor (R-C) snubber, capacitor and freewheeling diodes, capacitor. The most widely used snubber circuit is R-C. The presented EVR used the R-C snubber to protect the TRIACs from circulating currents and ensuring a smooth start. Jitaru et al. (EP 1618639A1) discloses an active R-C snubber which is used in power converters. This R-C snubber has a significant effect on the transient behaviors of the converter.

In Stich (U.S. Pat. No. 4,622,513), the on-load tap changer is enhanced by a thyristor circuit. The noted feature of this invention is that it controls the overvoltage happening when the switch in a switched current path is switched off. To do so, a thyristor circuit is switched on during that time automatically. The downside of this design is that the thyristor in charge of the overvoltage circuit will experience a large pulse, which can cause the thyristor to fail, reducing reliability. The second feature of the said invention is that a bi-directional parallel thyristor is triggered by a current transducer to help an electromechanical switch, e.g. microswitch or relay, to disconnect the switched current path. The bidirectional parallel thyristors are connected in parallel with the mechanical switch, and the bidirectional parallel thyristors may be switched on by mistake with pulse interference and cause short circuited circulation. Thus, the overvoltage triggering thyristor circuit in the invention is connected in series with a resistor to limit the likely short circuit circulation to guarantee the safety of the thyristor. However, the presented EVR uses a zero-crossing optotriac along with the snubber circuit to avoid any possible interferences between TRIACs.

In Stich '513, the heating of the transition resistor is reduced, but the heating level of the transistor is still high. The enhanced version of Stich '513 is disclosed in Stich (U.S. Pat. No. 7,595,614).

In Li (U.S. Pat. No. 9,898,019), the mentioned problem is solved, especially the ones related to transition resistor. In this patent, there is no transition resistor, and it has a short circuit current circulation limit measure and is high in safety and high in reliability. This patent however used a thyristor assisted on-load tap changer which included a costly main path and transition path; the main path included a power switch, and the transition path included a linear reactor, a saturable reactor and an overvoltage triggering thyristor circuit, which are all connected in series, are costly and introduces complexity and opportunities to fail. Instead of this complex method, the presented EVR uses a zero-crossing optotriac along with the snubber circuit to avoid any possible interferences between TRIACs.

Raedy (US 2006/0082350) discloses an electronic tap changer transformer. The proposed OLTC used back-to-back thyristors connected to each tap lead, so there is no electromechanical part in this invention. However, the presented OLTC has numerous tap leads, resulting in a higher cost. Also, the main challenges to the thyristors are to the rate of change for voltage (dv/dt), the rate of change for current (di/dt), and overvoltage when turning the circuit ON and OFF. It is known that these problems can be managed to a large extent by using a snubber circuit, but unfortunately a snubber circuit was not used in the presented patent, that the voltage and current transients could cause the thyristor or even the whole system to fail. One may observe that to mitigate these transients, the power factor correction devices may be used along with this transformer in most cases that can apply more cost to the system. To manage the transient voltage and current, the presented EVR uses an R-C snubber circuit which is simple to implement and cost-effective.

Strijker (U.S. Pat. No. 7,675,280) proposes a power factor correction boost circuit. The invented circuit includes a controller which receives the input voltage and the output voltage, and then the controller gives the required signal to the power switch, IGBT or MOSFET, which is placed at the output side. This proposed power factor correction (PFC) device uses either an inductor or a transformer to act as filter or change the level of voltage or current. The invented power factor correction circuit employs a big capacitor at the output side of the circuit in order to increase the accuracy. In most cases, the proposed circuit can provide the accuracy of more than 99%. However, the capacitor is typically an expensive component in the whole PFC circuit. Also, the higher rating will make the PFC circuit more expensive and larger, and for higher voltage ratings, larger capacitors should be used. The presented EVR has a ladder of power capacitors which can act as the power factor corrector. This might reduce the need of using the capacitor bank.

Various aspects of the invention will now be described in more detail with reference to the drawings.

Figure 1:
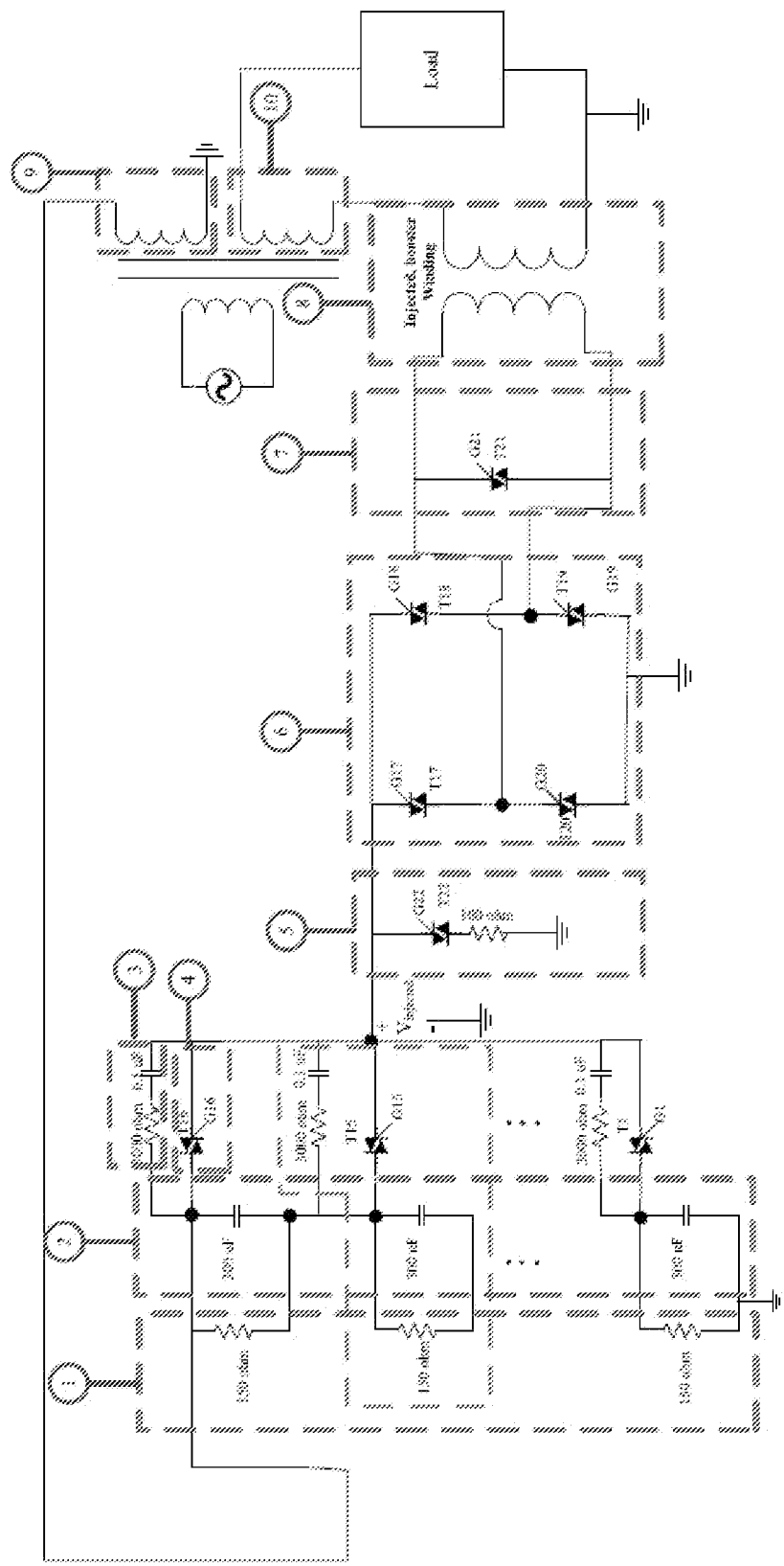
FIG. 1 illustrates a multi (sixteen)-level regulator in accordance with an exemplary embodiment, which may be utilized as a substitute for mechanical tap changing transformers.
Figure 2A:
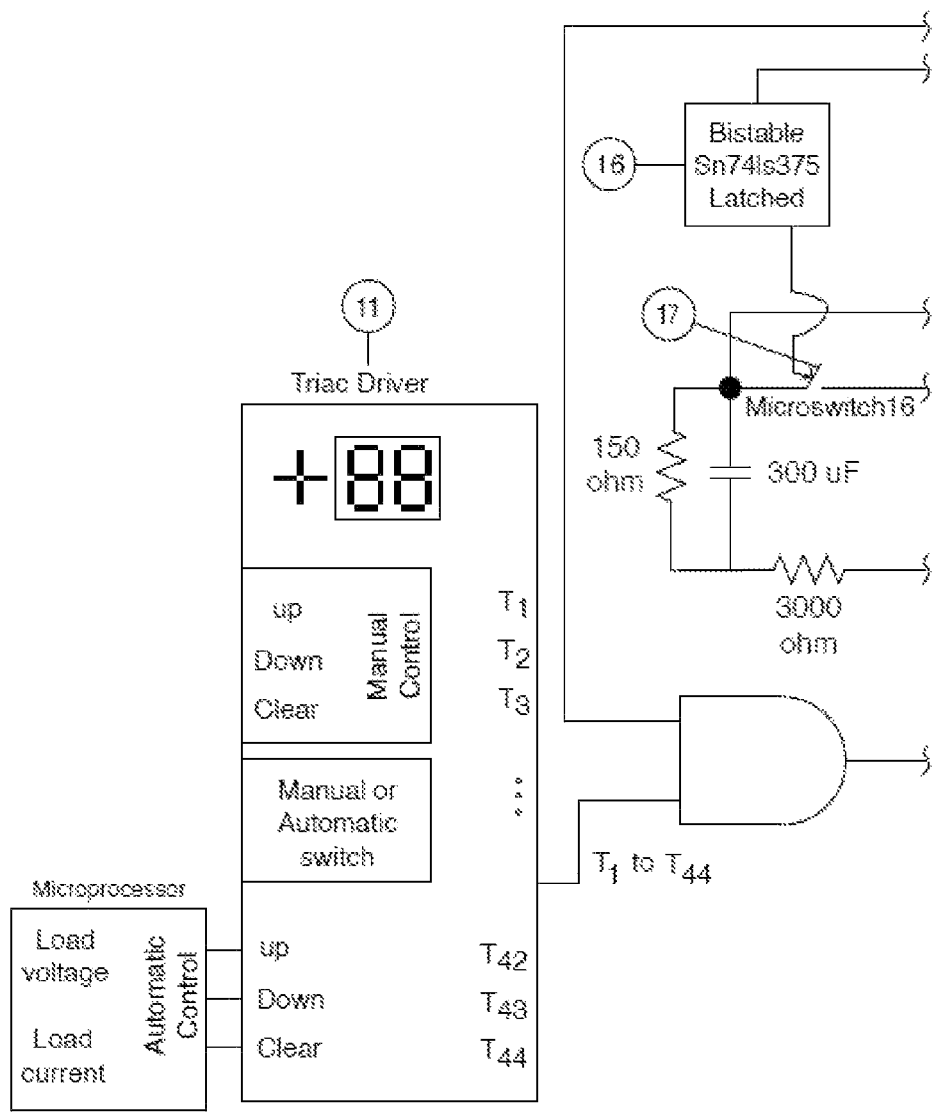
FIG. 2A illustrates a first part of a first failure detection circuit for a TRIAC in accordance with an embodiment.
Figure 2B:
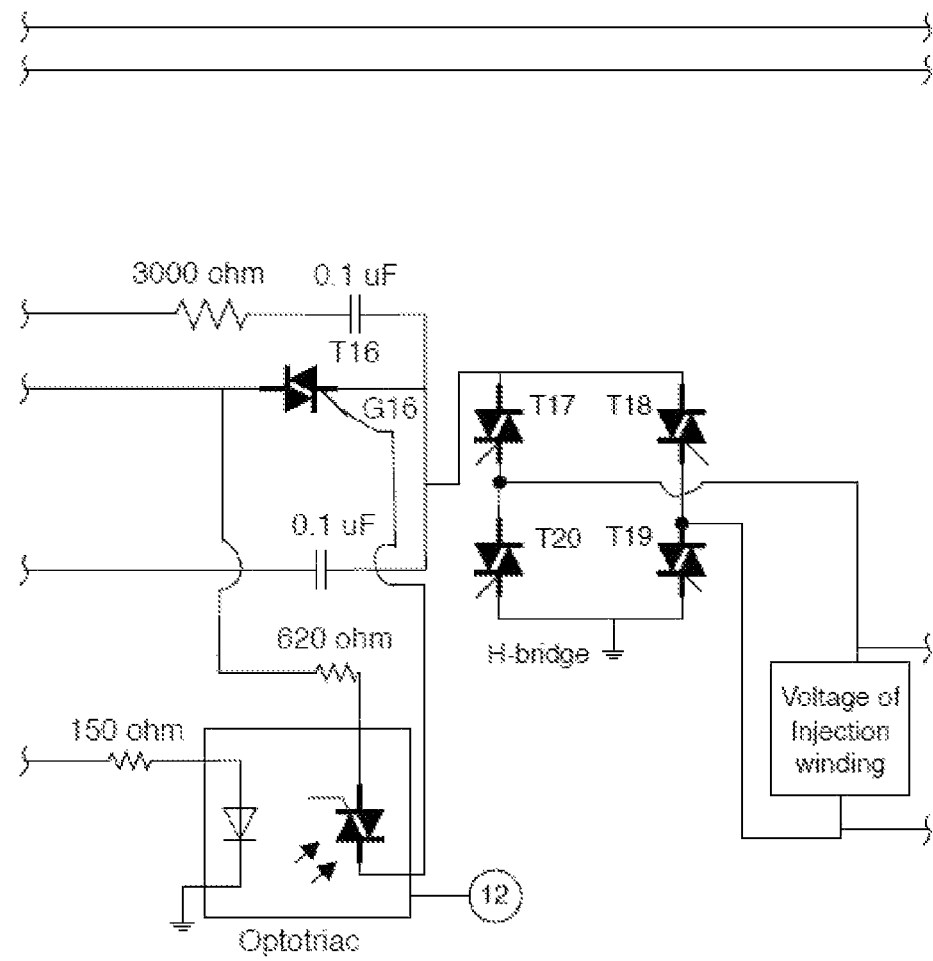
FIG. 2B illustrates a second part of the first failure detection circuit.
Figure 2C:
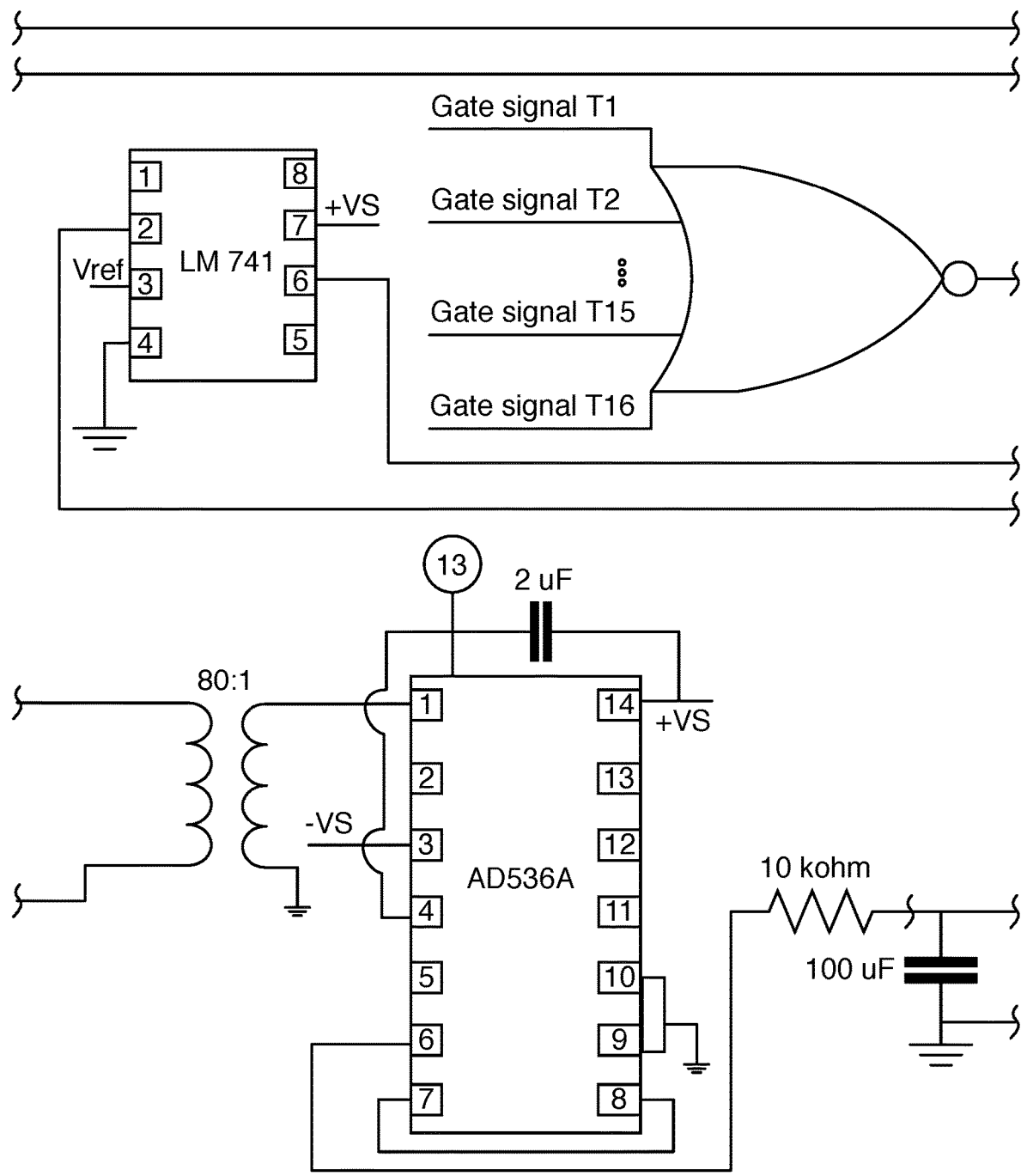
FIG. 2C illustrates a third part of the first failure detection circuit.
Figure 2D:
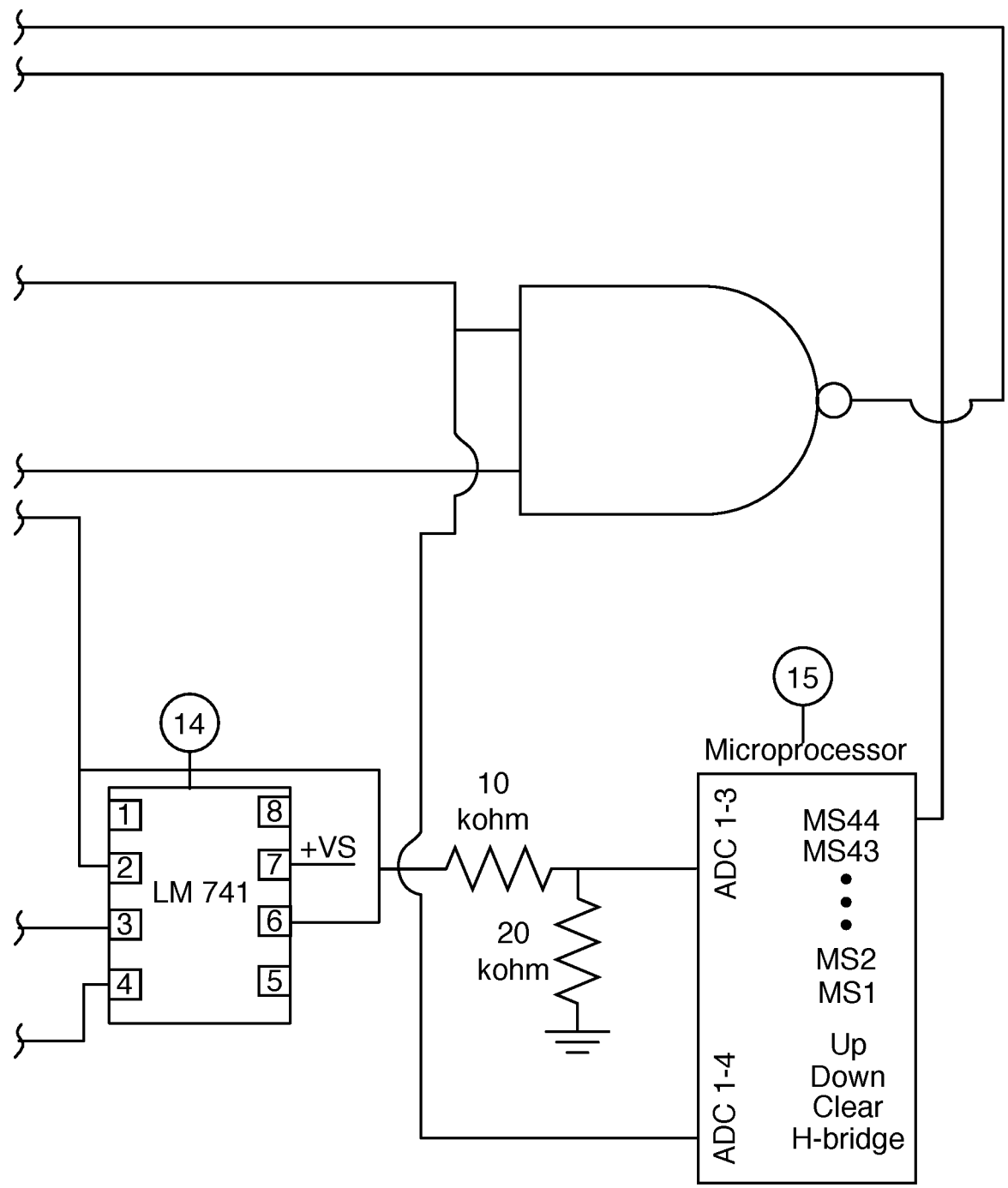
FIG. 2D illustrates a fourth part of the first failure detection circuit.

Now referring to FIG. 1 the presented EVR includes a high-power section comprised of capacitor ladder, power resistors in parallel with each capacitor, and TRIACs. Also, the snubber circuit is also used in high power side to improve dv/dt and di/dt of the TRIACs. The low power section comprises a control module which includes microprocessor, digital logic gates, a TRIAC driver circuit, such as a TTL drive, and a zero-crossing optotriac.

The Electronic Voltage Regulator (EVR) Driver is a circuit controlling operation of the power electronic switches, TRIACs, thyristors, IGBTs, in the capacitive ladder. The driver circuit can be based on optical links, signal processing units, integrated circuits, pulse transformers, and/or logic gates. The Driver in the presented circuit is based on two SN74192 or CD74HC192E integrated circuits, one for each digit for the digital readout. They are synchronous 4-bit up/down counters using Binary Coded Decimal (BCD) logic creating an 8-bit logic system and are supported with additional logic gates and invertors for data processing to customize the operation specifically to the functionality of the EVR.

The driver actuates the TRIACs for all EVR steps of operation sequentially, one at a time, while keeping all other TRIACs switched off. The tap change can be performed between neighboring taps, or if needed, any pair of taps. The driver also controls the H-Bridge and allows for the H-Bridge to be in either additive, or positive-injection (PI), subtractive, or negative-injection (NI) or zero-injection (ZI) modes. The Driver performs this operation automatically, depending on the steps activated by the Raise/Lower manual switches located on the driver board or externally.

The driver can also connect and communicate with external controllers through an interface section on the board. The driver has a switch that allows the user to toggle between the on-board or external control. External control, i.e. Raise, Lower and Reset, can be realized through the clock pulses for each switch. The external control can use the integral, customizable controller, or an interface module can be used to integrate to the EVR Driver the controllers already present in the market for controlling operation of electromechanical on load tap changers.

The zero-crossing optotriac enables the TRIAC to be turn on or off in either zero voltage or zero current, which follows the general principles of the soft switching. More detailed explanations of the EVR are as follows:

The EVR can provide different (multi) voltage levels by using a capacitor ladder, referred to in FIG. 1. In this design, there is no need to use buck-boost converters which are costly and require complex control circuits, as power capacitors in the ladder are able to provide the required voltage level to keep the load voltage almost constant. FIG. 1 shows application of the disclosed EVR in a transformer designated for tap changing operation. There are different windings in the structure, namely the injection and injected windings (8), auxiliary winding (9), and load winding (10). The disclosed regulator receives the voltage from an auxiliary winding and provides multi-level voltages (sixteen are shown in this example, but it can be any practical number) to an injected winding which is in series with the load winding. The regulator applies zero voltage to the injected winding if the load voltage remains constant. If the load voltage changes, the regulator inserts a positive or negative voltage in steps via the H-bridge (6) to keep the load voltage in an acceptable range. Also, a crowbar circuit (5) is employed in order to reduce the voltage level while all TRIACs are off, at a predetermined level. This is a useful approach for the control system to find a failed TRIAC.

The range of voltages applied by the presented regulator are at a maximum—equal to the output voltage value of the auxiliary winding, through zero to a minimum of a reversed auxiliary winding voltage. The control system determines which TRIAC (4) and voltage level should be on, and this decision is made based on feedback signals from the load voltage and current. The disclosed regulator can solve problems associated with electro-mechanical tap changers such as arcing effects, harmonic issues, slow tap changing processes, and slow failure detection systems.

Still referring to FIG. 1, resistors (1) are used in parallel with each capacitor (2) to enable a soft start. This method is simple to implement compared with the method in the Matins '121. Also, using the resistor in parallel can also provide a soft start similar to the results provided in the mentioned Matins '121. The R-C snubber is employed to help the soft start process as well as comforting the transient behavior of the TRIAC.

Now referring to FIGS. 2A, 2B, 2C and 2D, shown is a failure detection circuit which is provided in order to find a failed TRIAC, and protect the system from complete failure. According to this approach, the voltage before the H-bridge circuit is measured using a potential transformer or voltage potential screen while all gate signals are off. If the measured voltage is less than a predetermined value, it means that one TRIAC has failed. Then, the control system removes (bypasses) the failed TRIAC from the circuit, using a microswitch or relay, so the system can keep working. The time duration for the control system to measure the voltage before the H-bridge circuit is selected at 20 ms, while all TRIAC gates are off. The 20 ms period is detectable by the control system through the digital logic circuit (30), that includes NOR and AND gates. This 20 ms period will happen, if any change occurs in voltage level of the EVR. It means that there is only a 20 ms delay from any change in EVR voltage. In addition, the crowbar circuit (5) is only active during this 20 ms in order to reduce the voltage level of the regulator while all TRIACs are off, and this is to have a simpler control circuit. The control system is based on a programmable microprocessor (15) in which the required functions are customized. The microswitch (17) becomes activated only when its corresponding TRIAC fails. Also, the proposed voltage regulator has a self-healing feature where if one TRIAC is failed, both the parallel microswitch (18) and TRIAC (19) will be activated. The signal for the microswitch (17) is received from the bi-stable latch (16) and microprocessor (15). Also, the required signals for TRIAC (19) and the second microswitch (18) is coming from the microprocessor. The inputs for the microprocessor are provided via the AC (RMS)-to-DC converter IC (13) and simple comparators (14).

FIGS. 3A, 3B, 3C, 3D, 3E and 3F shows the voltage regulator structure in which a second method is used. The redundant, parallel unit (20) includes the redundant TRIACs and microswitches which are activated when a TRIAC at their corresponding voltage level fails. The redundant unit is connected to the H-bridge via microswitches (MS) (21). When one TRIAC in the main unit fails, the microswitch (21) is activated to connect the parallel unit to the main H-bridge. In addition, a redundant H-bridge unit (23) is employed as well. This unit is used when the main H-bridge (29) fails. The main unit (26) can be connected to the parallel H-bridge via microswitch (27) as well as through microswitch (28) which connects the main unit to the main H-bridge. Likewise, the parallel TRIAC ladder (20) is connected to the redundant H-bridge (23) through microswitch (22). The output of the main H-bridge and the redundant one are connected to the injected winding via four microswitches (24 and 25) disconnect the failed H-bridge from the load path. This second failure method is more cost effective as compared to the circuit shown in FIGS. 2A, 2B, 2C and 2D.

Referring to FIGS. 4A, 4B, 4C and 4D, another TRIAC failure detection circuit is presented. This detection circuit finds the failed TRIAC in less than 20 ms while all TRIACs are off. This detection system shuts down the regulator via TTL logic and an optotriac (12). During this time, TRIAC $T_{21}$ (7) will be activated to apply a zero injection when a TRIAC fails, so a zero voltage will be applied from the regulator side to the injected winding. A message will be sent to the control unit to replace the failed TRIAC. The second method can be implemented only with an analog circuit and without using a microprocessor. Also, the control circuit of both the first and second failure detection methods includes a TRIAC driver (11) in which only logic gates are employed. This TRIAC driver is a necessary interface between the microprocessor and TRIAC in order to protect the microprocessor from any negative effects that might happen in the TRIAC circuit.

Now referring to FIG. 5, shown is a block-based representation of the proposed EVR. According to FIG. 5, a microcontroller including failure a detection instruction (31) measures the load voltage and current and provides either an up or down signal to the TRIAC driver (32). The TRIAC driver itself provides a proper signal for the optotriac (33) corresponding to each TRIAC. After the optotriac, the signal for main and redundant units (34) are provided.

The change speed from one voltage to the other could be adjusted by the operator in this new EVR. This feature is important especially when the regulator is used as a tap changing transformer when customers want to have the option to adjust tap changing speeds. This can also enable the operator to have smoother movements from one tap to the other, and increasing the EVR's lifetime.

To protect the TRIAC from overheating, a cooling system is designed in which every set of TRIACs is attached to a heatsink with or without a fan, or the whole power module with capacitors, TRIACs and resistors can be immersed in cooling liquid, e.g. transformer oil. This cooling system can manage the TRIAC's thermal sensitivity and prevent a TRIAC from turning on spontaneously. This solution is also cost effective in increasing the system's reliability.

The power factor correction is one of the most important advantageous of the disclosed regulator. In power systems with transformers, capacitor banks are added to the system in order to correct the power factor, which applies cost. However, the proposed invention has a ladder of power capacitors which itself is a capacitor bank and can improve the power factor, which removes the need to an external power factor corrector.

A capacitor ladder, despite the advantages described above, can cause the TRIACs and each capacitor itself to experience a high value of transient voltage or current while the load current of the EVR exceeds a certain value specific for circuit components selected for the application. The transient value can occur because of the inductive characteristics of the load and the existing transformer in the structure shown in FIG. 1. The simulation results and experiments showed that under a certain value of the load, the transient voltage across the capacitor and TRIACs can exceed a level even several times higher than their rating values. It can be expected when the load current is higher than the specific limiting value, the dielectric failure can happen to the TRIACs. Considering the mentioned points, FIG. 6 is proposed as a possible solution to avoid the excessive transient voltage to occur across the capacitor and TRIACs. The solution disclosed here is to utilize the transient voltage suppressors in parallel with each of two capacitors. The transient voltage suppressors clamps down any high transient voltage across the capacitors, and this protects the TRIACs and capacitor from possible failure.

As well as that, there are feedback voltage effects from the load winding shown in FIG. 1 (10), transferred to the EVR side, and this feedback effect intensifies with the increase in the current of the EVR. The simulation and experimental results showed that the voltage of the load winding can increase the voltage across the capacitors to the value higher than their rated voltages, which can cause the failure of the capacitor. To solve this issue in the presented 16-stage EVR, a TRIAC, $T_{22}$, in series with a resistor as shown in FIG. 1 (5) is used to remove the transient voltage coming from the load winding. The control system provides the gate signals to the TRIAC, $T_{22}$, by sensing the voltage of the primary winding (8) whenever the voltage of the activated level exceeds its expected value, which can be due to the effect of the load winding. Referring to FIG. 6 (35), Transient Voltage Suppressors (TVS) are used to reduce the transient voltage across capacitors to a safe level. Moreover, when the transient voltage is transferred from the auxiliary winding, Metal Oxide Varistor (MOV) at FIG. 6 (36) is used along with the TVS to provide additional protection.

When the load current is higher than the specific value characteristic for a given circuit, the phase shift, or phase angle difference, between the voltage injected by the EVR and the load winding voltage increases which may cause the load voltage to fall out of its acceptable range. The change in the phase shift is caused by different phase angles of the voltage drop across the capacitor ladder along with the inductive reactance of the system, which increases under higher current. In this case, the control system detects the phase shift. If the phase shift is within the acceptable range, the normal tap voltage change process continues operating. Otherwise, the control system activates a voltage level that is closer to being in phase with the load winding voltage. The process of selecting the proper voltage level under the phase shift condition is performed by a high-speed DSP processor, and this makes the response of the system to any unacceptable change fast and robust.

Thus, in an aspect, there is disclosed an electronic voltage regulator (EVR) for maintaining a desired transformer voltage in transformer applications, comprising: a high-power section implemented as an electronic circuit and including: a capacitor ladder connecting a plurality of capacitors in series, and configured as a voltage divider; a plurality of power resistors operatively connected in parallel with each capacitor of the capacitor ladder; and a plurality of TRIACs to switch and control AC voltages; and a low-power section implemented as an electronic circuit and having a control module, the control module including: a microprocessor; digital logic gates controlled by the microprocessor; a TRIAC driver to control the plurality of TRIACs; and a zero-crossing optotriac to enable the plurality of TRIACs to be turn on or off in either zero voltage or zero current; whereby, in operation, the capacitor ladder is connected across an input voltage and utilized as an electronic tap changer to provide additive or subtractive voltages to maintain the transformer output voltage at a desired level, or within an acceptable range.

In an embodiment, the TRIAC driver to control the plurality of TRIACs is a TTL drive.

In another embodiment, the EVR is further adapted to be utilized as one of: (i) a stand-alone regulated voltage source, (ii) an electronic tap changer for power transformer in direct or indirect regulation scheme, or (iii) an electronic tap changer for the voltage regulator.

In another embodiment, the EVR is further adapted to perform a soft start utilizing passive components including parallel resistors operatively connected to each capacitor in the capacitor ladder, and an R-C snubber.

In another embodiment, the EVR is further adapted to detect failure, and upon detection perform a self-healing feature.

In another embodiment, the self-healing feature comprises a redundant TRIAC adapted to be active upon removal of a failed TRIAC to enable the system to keep working.

In another embodiment, the capacitor ladder is adapted to perform the function of a power factor corrector for a typical inductive load of the regulated system.

In another embodiment, the EVR is adapted to provide different voltage levels without using high-cost power converters.

In another embodiment, the EVR is adapted to allow selection of a changing speed from one voltage another.

In another aspect, there is provided a method of maintaining a desired transformer voltage in transformer applications utilizing the EVR as described above.

It will be appreciated that for simplicity and clarity of illustration, where considered appropriate, reference numerals may be repeated among the figures to indicate corresponding or analogous elements or steps. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

While illustrative embodiments have been described above by way of example, it will be appreciated that various changes and modifications may be made without departing from the scope of the invention, which is defined by the following claims.

What is claimed is:

1. An electronic voltage regulator (EVR) for maintaining a desired transformer voltage in transformer applications, comprising:
    a high-power section implemented as an electronic circuit and including:
        a capacitor ladder connecting a plurality of capacitors in series, and configured as a voltage divider;
        a plurality of power resistors operatively connected in parallel with each capacitor of the capacitor ladder; and
        a plurality of TRIACs to switch and control AC voltages; and
    a low-power section implemented as an electronic circuit and having a control module, the control module including:
        a microprocessor;
        digital logic gates controlled by the microprocessor;
        a TRIAC driver to control the plurality of TRIACs; and
        a zero-crossing optotriac to enable the plurality of TRIACs to be turn on or off in either zero voltage or zero current;
    whereby, in operation, the capacitor ladder is connected across an input voltage and utilized as an electronic tap changer to provide additive or subtractive voltages to maintain the transformer output voltage at a desired level, or within an acceptable range.

2. The EVR of claim 1, wherein the TRIAC driver to control the plurality of TRIACs is a TTL drive.

3. The EVR of claim 1, wherein the EVR is further adapted to perform a soft start utilizing passive components including the parallel resistors operatively connected to each capacitor in the capacitor ladder, and an R-C snubber.

4. The EVR of claim 1, wherein the EVR is further adapted to detect failure, and upon detection perform a self-healing feature.

5. The EVR of claim 4, wherein the self-healing feature comprises a redundant TRIAC adapted to be active upon removal of a failed TRIAC to enable the system to keep working.

6. The EVR of claim 1, wherein the capacitor ladder is adapted to perform the function of a power factor corrector for an inductive load of the transformer.

7. The EVR of claim 1, wherein the EVR is adapted to provide different voltage levels without using power converters.

8. The EVR of claim 1, wherein the EVR is adapted to allow selection of a changing speed from one voltage another.

9. A method of maintaining a desired transformer voltage in transformer applications utilizing the EVR of any one of claims 1 to 8, comprising the steps of:
   measuring the output voltage of the EVR and the transformer; and
   if the output voltage is higher than a predefined minimum voltage threshold, then additional voltage is applied to maintain the output voltage at a desired level.

10. An electronic voltage regulator (EVR) for maintaining a desired voltage in power supply applications, comprising:
   a high-power section implemented as an electronic circuit and including:
      a capacitor ladder connecting a plurality of capacitors in series, and configured as a voltage divider;
      a plurality of power resistors operatively connected in parallel with each of the plurality of capacitors of the capacitor ladder; and
      a plurality of TRIACs to switch and control AC voltages;
   a low-power section implemented as an electronic circuit and having a control module, the control module including:
      a microprocessor;
      an at least one digital logic gate controlled by the microprocessor;
      a TRIAC driver to control the plurality of TRIACs; and
      a zero-crossing optotriac to enable the plurality of TRIACs to be turned on or off in either zero voltage or zero current;
   whereby, in operation, the EVR is utilized as a stand-alone regulated voltage source.

11. An electronic voltage regulator (EVR) for maintaining a desired voltage in the voltage regulator applications in direct or indirect regulation schemes, comprising:
   a high-power section implemented as an electronic circuit and including:
      a capacitor ladder connecting a plurality of capacitors in series, and configured as a voltage divider;
      a plurality of power resistors operatively connected in parallel with each capacitor of the capacitor ladder; and
      a plurality of TRIACs to switch and control AC voltages; and
   a low-power section implemented as an electronic circuit and having a control module, the control module including:
      a microprocessor;
      an at least one digital logic gate controlled by the microprocessor;
      a TRIAC driver to control the plurality of TRIACs; and
      a zero-crossing optotriac to enable the plurality of TRIACs to be turned on or off in either zero voltage or zero current;
   whereby, in operation, the EVR is utilized as an electronic tap changer to provide additive or subtractive voltages to maintain the voltage regulator output voltage at a desired level, or within an acceptable range.

* * * * *